July 22, 1958  B. N. PIERCE  2,844,202
TRIMMING MECHANISM FOR SEWING MACHINES
Filed Nov. 3, 1954  2 Sheets-Sheet 1

Inventor:
Bernard N. Pierce
By Church & Church
His Attorneys

July 22, 1958 B. N. PIERCE 2,844,202
TRIMMING MECHANISM FOR SEWING MACHINES
Filed Nov. 3, 1954 2 Sheets-Sheet 2
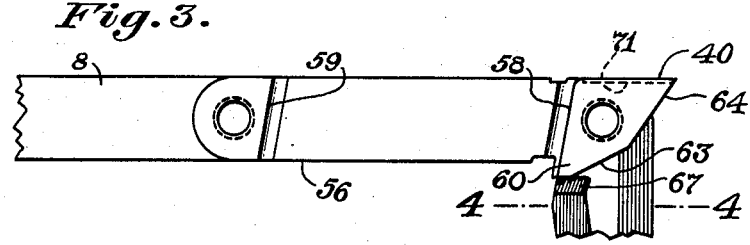
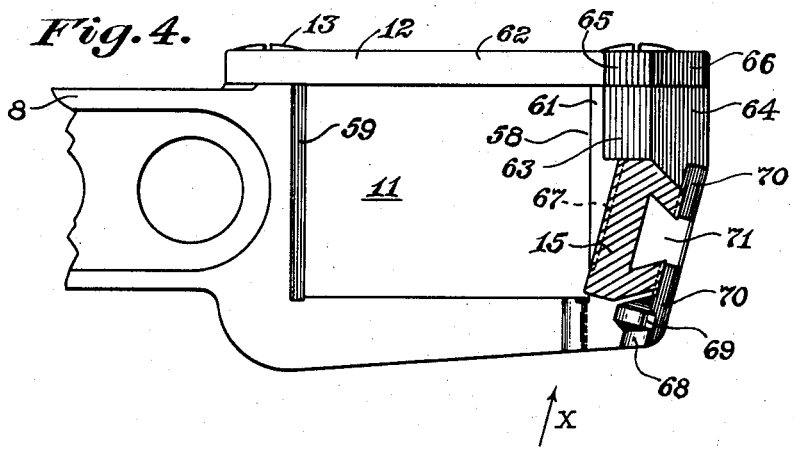
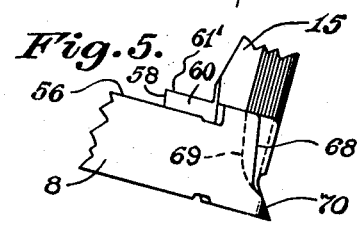
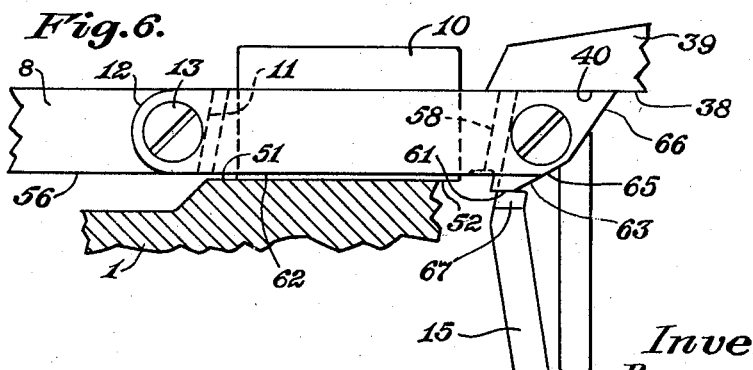
Inventor:
Bernard N. Pierce
By Church & Church
His Attorneys

United States Patent Office 2,844,202
Patented July 22, 1958

2,844,202

TRIMMING MECHANISM FOR SEWING MACHINES

Bernard N. Pierce, West Hartford, Conn., assignor to The Merrow Machine Company, Hartford, Conn., a corporation of Connecticut Application November 3, 1954, Serial No. 466,611

10 Claims. (Cl. 164—17.5)

This invention relates to trimming mechanisms for sewing machines and more particularly to especially formed portions of a carrier for the movable cutter of such trimming mechanisms which effectively prevent excess lubricant from flowing to portions of the machine where it might come in contact with the work.

Trimming mechanisms of this type are conventionally driven at high speeds in the region of approximately 5000 strokes per minute and therefore require a plentiful supply of lubricant to effectively lubricate all bearing surfaces within the machine. Usually lubricant is distributed throughout the machine by a pump and by the motion of the various parts. Centrifugal force may be utilized to cause the flow of lubricant to desired areas. At the same time, great care must be exercised to prevent the lubricant from being impelled to parts of the machine which are closely associated with the work.

An object of the present invention is to provide an oscillatory cutter carrier that is effective to guide excess lubricant in contact with certain portions of the cutter carrier away from those portions of the cutter carrier adjacent the work and from which excess lubricant might come in contact with the work material.

Another object of the invention is to provide an oscillatory cutter carrier from which excess lubricant, discharged from lateral surfaces of the cutter carrier, is guided to a bearing surface on the opposite side of the cutter carrier.

These objects are achieved by providing a cutter carrier that is formed with certain surfaces thereof transversely disposed at an angle to the plane in which the carrier oscillates so that lubricant impelled by centrifugal force radially along the carrier, from its axis of oscillation, is guided by said surfaces and diverted from other surfaces from which the excess lubricant might come in contact with the work.

Other objects and advantages of this invention will become apparent by reference to the following specification and the accompanying drawings.

In the drawings, in which like numerals designate like parts throughout the several views:

Fig. 3 is a plan view of the distal end of the oscillatory cutter carrier which in Fig. 1 is shown in assembled relationship with a sewing machine frame;

Fig. 4 is a sectional view taken on line 4—4 of Fig. 3 and showing a bar omitted in Fig. 3;

Fig. 5 is a bottom view of the cutter carrier taken in the direction indicated by arrow X in Fig. 4; and Fig. 6 is an enlarged detail view of certain assembled parts shown in Fig. 2.

Figure 1:
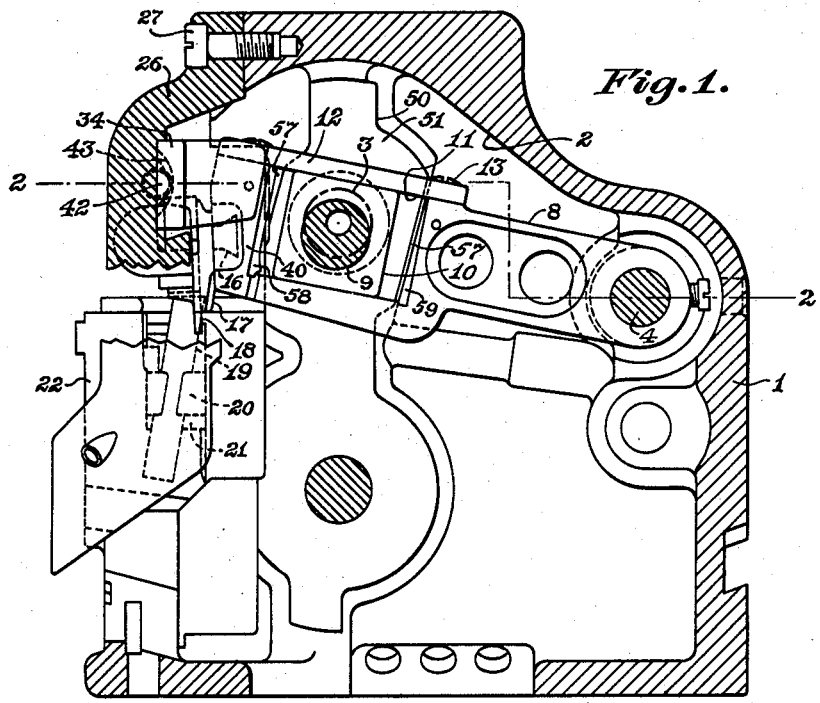
Fig. 1 is a vertical sectional view through a mechanism compartment of a sewing machine showing in side elevation, elements of a trimming mechanism embodying my invention.

Referring to the drawings, the frame of the sewing machine that is partially illustrated includes a main frame casting 1, having a mechanism compartment 2, wherein are supported a driven shaft 3 and a rock-shaft 4. A cutter carrier 8 in the form of an elongated lever arm is supported for oscillatory movement on rock-shaft 4 and is actuated in such movement by an eccentric 9 on shaft 3. A slide-block 10, which receives eccentric 9, is confined to longitudinal movement in yoke opening 11 in cutter carrier 8, one wall of opening 11 being formed by a bar 12 secured by screws as 13.

Radially outward of the yoke portion 11 of carrier 8, and at the distal end thereof, is a laterally extending arm 15 which projects from one side of carrier 8. Arm 15 is channeled at 16 to adjustably receive a holder 17 for an upper cutter blade 18. Oscillatory movement of carrier 8 causes blade 18 to cooperate with a blade 19 secured by a clamp 20 to lower cutter holder 21. Holder 21 is slidably mounted in support 22 and is urged by spring means (not shown) to maintain cutter 19 in firm contact laterally with cutter blade 18.

The trimming mechanism briefly described above is, in general, characteristic of well-known Merrow overseaming machines similar to those illustrated and described in United States Patent No. 733,760, granted to William H. Stedman, July 14, 1903, and in United States Patent No. 1,207,063, granted to Joseph M. Merrow, December 5, 1916.

Figure 2:
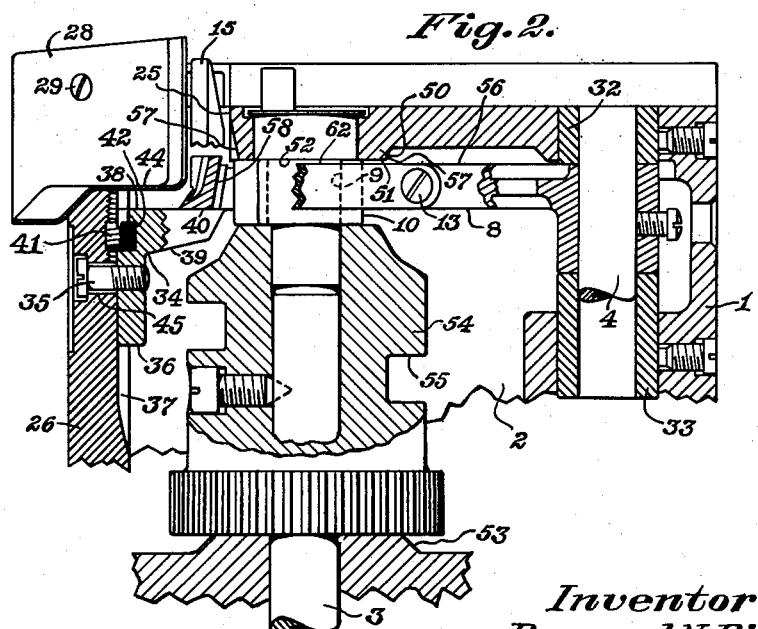
Fig. 2 is a horizontal sectional view showing the machine frame in section partly on line 2—2 of Fig. 1 with certain parts broken away.

Laterally disposed arm 15 of the carrier 8 extends through an aperture 25 (see Fig. 2) leading from mechanism compartment 2. Normally an opening, of which aperture 25 is a part, is otherwise closed, partly by a frame cap 26 removably secured to the machine frame 1 as by screws 27, and partly by a sheet metal closure 28 secured to the lower cutter holder support 22 and elsewhere (not shown) by screws as at 29. In the vicinity of this aperture, it is highly important that oil be prevented from flowing onto arm 15, thence to parts carried by the arm and finally to areas traversed by material comprising the work. At the same time it is necessary, due to the high speed at which cutter arm 8 is oscillated, to provide for adequate lubrication of the bearing surfaces which are described below.

Lateral support for cutter carrier 8, adjacent its pivotal end, is provided by bushings 32 and 33 in which rock-shaft 4 is journalled. Supplemental lateral support for carrier 8 adjacent the distal end thereof is provided by an L-shaped bearing block 34 secured to frame cap 26 by a screw 35. One leg 36 of L-shaped block 34 is slidably fitted in channel 37 formed in frame cap 26 so that block 34 may be adjusted to bring surface 38 of leg 39 into bearing engagement with side bearing surface 40 on the side of carrier 8 at the distal end thereof. Such bearing support in this area is effective to resist lateral pressure on the carrier 8 that is derived from spring pressure applied to hold cutter 19 in engagement with cutter 18, such pressure being transmitted through clamp 17 mounted on arm 15 of carrier 8.

Accurate positioning of block 34 is accomplished by adjustment of screw 41. This screw is longitudinally confined in a recess 42 formed in block 34, while the threads of the screw are in engagement with threads 43 formed in frame cap 26. Access to screw 41 is normally blocked by a wall 44 of closure 28, but closure 28 is readily removable to provide access to screw 41. Screw 35 serves to clamp bearing block 34 in its adjusted position. Frame cap hole 45, through which screw 35 extends, is provided with sufficient clearance to accommodate the range of adjustment desired.

A boss 50 is formed on frame 1 and provided with a plane surface 51 which comprises a bearing to receive the thrust of side bearing face 52 on slide-block 10. Secured on shaft 3 between slide-block 10 and a boss 53 of machine frame 1 is a cam 54 provided with a groove 55 for reciprocating a looper carrier (not shown). Alternate end thrust of cam 54 in opposite directions causes corresponding application and release of pressure between bearing surfaces 51 and 52 respectively on boss 50 and slide-block 10. The effect of this action on the oil film between surfaces 51 and 52 is to spurt or spray the oil outwardly in the plane of surfaces 51 and 52. Surface 51 of boss 50 is laterally opposite a side surface 56 of carrier 8, however, there is no thrust of carrier 8 toward surface 51 and between these surfaces a slight clearance is provided (see Fig. 2).

The width of boss 50 is established by sides 57 which diverge slightly from each other in the direction of their extent away from bearing surface 51. End walls 58 and 59 of yoke opening 11 define the length of said opening as greater than the width of surface 51. Thus, there is provided at the sides of boss 50 a clearance that is conducive to the escape of lint which otherwise would be prone to become packed at the ends of yoke opening 11 by action of reciprocating slide-block 10 mounted therein. The deleterious results which follow from such packing of lint are well known to those familiar with the sewing machine art.

Cutter carrier 8, driven from shaft 3 by eccentric 9 and slide-block 10, is oscillated at high speed about the axis of rock-shaft 4. Adequate lubrication of the bearing surfaces involved means that considerable oil will flow onto cutter carrier 8 and due to its high speed of oscillation will become subjected to a considerable centrifugal force. This centrifugal force tends to drive excess oil on carrier 8 to the distal end of the carrier. Adjacent the distal end of the carrier, lateral arm 15 extends through aperture 25 and ordinarily any oil on carrier 8 would be driven by centrifugal force of the oscillations outwardly along carrier 8 and thence from surface 56 on carrier 8 onto arm 15. Since arm 15 is so located as to be adjacent material being worked, this oil would eventually come into contact with the work material.

To prevent this undesired flow of oil, as well as to intercept oil sprayed from between surface 51 of boss 50 and the opposed surface 52 of slide-block 10, a lubricant deflecting surface is afforded by lateral extension of end wall 58 of yoke opening 11. By increasing the thickness of carrier 8 as at 60 (see Fig. 3) this end wall or surface 58 is extended so as to intersect the plane of surface 56 and also the plane of contact of surfaces 51 and 52 respectively of frame 1 and slide-block 10. This surface 58 extends transversely across carrier 8 to the bearing surface 40 of the carrier and diverges radially outwardly from the axis of rock-shaft 4. As carrier 8 oscillates, oil which may be advanced along surface 56 of carrier 8 and oil sprayed from between the opposing surfaces 51 and 52 of frame 1 and slide-block 10 respectively is intercepted by surface 58 and thus prevented from reaching arm 15. Due to the divergence of the surface of end wall 58 with respect to the axis of rock-shaft 4, oil which comes in contact with surface 58 flows by centrifugal force to the radially outermost portion of surface 58 upon oscillation of carrier 8. At the side of carrier 8, presenting bearing surface 40, oil flows from surface 58 toward the bearing surface 38 of block 34. Some of the oil which is diverted in this manner effectively lubricates the bearing between surfaces 38 and 40 while the rest is safely disposed of well within compartment 2 of machine frame 1.

Such oil as may be deposited upon a surface 61 of carrier 8 and 62 on bar 12, as from adjacent bearings, is impelled radially outwardly by centrifugal force toward the extreme distal end of carrier 8 and bar 12. Safe disposal of this oil away from underlying arm 15 is effected by lubricant directing surfaces 63 and 64 on carrier 8 and surfaces 65 and 66 on bar 12. Surfaces 63, 64, 65 and 66 are disposed in planes which diverge radially and outwardly with respect to the axis of rock-shaft 4. A surface 67 is located adjacent the juncture of arm 15 with surface 61 and serves to direct any oil deposited thereon upwardly to surface 63 whence it is disposed of in the manner above stated. Adjacent the juncture of the lower edge of arm 15 with carrier 8 is a surface 68 and indented from this surface is a depression or oil excluding recess 69. Such oil as may reach this surface 68 is prevented by centrifugal force from entering recess 69 and passes onto a surface 70 which is radially and outwardly divergent from the axis of rock-shaft 4 so that the oil is discharged by centrifugal force upon surface 38 of block 34 and thence into mechanism compartment 2.

Adjacent the area where bearing surface 40 is engaged by carrier 8, a suitable metal plate such as 71 is inlaid and secured, as by brazing, to carrier 8. This plate serves to bar entrance of oil from surface 40 into channel 16 of arm 15.

The centrifugal force ocasioned by the operation of cutter carrier 8 is utilized to direct the flow of lubricant in a manner which prevents it from coming in contact with the work material. The essence of the above described invention is obviously capable of adaptation to be used with other machines than the specific machine construction disclosed. The specific embodiment disclosed is to be construed as illustrative rather than limiting and the true scope of the invention is to be understood as limited only by the scope of the following claims.

What I claim is:

1. In a trimming mechanism for a sewing machine having a frame, a rock shaft journaled in said frame, an elongated cutter carrier pivotally supported at one end by said rock shaft, means including a sliding block disposed within a yoke on said carrier adapted to drive said cutter carrier in oscillatory movement about said rock shaft, a plane bearing surface on said frame at one side of said cutter carrier slidably engaging a face of said sliding block, a side bearing surface on the other side of said cutter carrier slidably engaging a mating side bearing surface on said frame, and a transverse wall on said cutter carrier having a surface which projects beyond said plane bearing surface and extends toward said side bearing surface so that lubricant ejected from the space between said sliding block and said plane bearing surface will be intercepted by the transverse wall and directed by centrifugal force towards said side bearing surface.

2. In a trimming mechanism for a sewing machine having a frame, a rock shaft journaled in said frame, an elongated cutter carrier pivotally supported at one end by said rock shaft, means adapted to drive said cutter carrier in oscillating rotary movement about said rock shaft including a sliding block disposed within a yoke on said carrier, a plane bearing surface on said frame at one side of said cutter carrier slidably engaging a face of said sliding block, a side bearing surface on the other side of said cutter carrier slidably engaging a mating side bearing surface on said frame, and an end wall on said cutter carrier having a lubricant deflecting surface extending from said side bearing surface transversely across said cutter carrier and projecting from said one side of said cutter carrier beyond said plane bearing surface, said lubricant deflecting surface being diverged from the axis of said rock shaft in a direction toward said side bearing surface so that lubricant ejected from the space between said slide block and said plane bearing surface is intercepted by the projecting portion of said lubricant deflecting surface and is directed to said side bearing surface by the centrifugal force resulting from the oscillating rotary movement of the cutter carrier.

3. In a trimming mechanism for a sewing machine having a frame, a rock shaft journaled in said frame, an elongated cutter carrier pivotally supported at one end of said rock shaft, cutter mounting means on the arm, means adapted to drive said arm in oscillating rotary movement about said rock shaft including a sliding block disposed within a yoke on said carrier arm, a plane bearing surface on said frame at one side of said arm slidably engaging a face of said sliding block, a side bearing surface on the other side of said arm extending to the distal end thereof and slidably engaging a second bearing surface on said frame, and an end wall on said arm between said sliding block and said cutter mounting means having a lubricant deflecting surface extending from said side bearing surface transversely across said cutter carrier and projecting from said one side of said arm beyond said plane bearing surface, the projecting portion of said lubricant deflecting surface being spaced radially outwardly from said plane bearing surface and diverging from the axis of said rock shaft in a direction toward said side bearing surface so that lubricant ejected from the space between said sliding block and said plane bearing surface is intercepted by the projecting portion of said lubricant deflecting surface and is driven to said side bearing surface by the centrifugal force resulting from said oscillating rotary movement on said arm, and is prevented from reaching said cutting mounting means.

4. In a trimming mechanism for a sewing machine having a frame, a rock shaft journaled in said frame, an elongated arm pivotally supported at one end by said rock shaft, cutter mounting means on said arm, a yoke on said arm, means adapted to drive said arm in oscillating rotary movement about said rock shaft including a sliding block disposed within said yoke, a plane bearing surface on a boss projecting from said frame engaging a face of said sliding block at one side of said arm, said yoke extending beyond the edges of said sliding block and said plane bearing surface, and a wall on the arm between said shaft and the cutter mounting means at the distal end of said yoke having a portion of its radially inward surface projecting from one side of said arm beyond said plane bearing surface so that lubricant ejected from the space between said sliding block and said plane bearing surface is intercepted by said projecting portion and diverted away from said cutter mounting means.

5. In a trimming mechanism for a sewing machine having a frame, a rock shaft journaled in said frame, an elongated cutter carrier pivotally supported at one end by said rock shaft, a yoke on said cutter carrier, means adapted to drive said cutter carrier in oscillating rotary movement about said rock shaft including a sliding block disposed within said yoke, a plane bearing surface on a boss projecting from said frame engaging a face of said sliding block at one side of said cutter carrier, a side bearing surface on the other side of the cutter carrier slidably engaging a mating side bearing surface on the frame, said yoke extending beyond the edges of said boss and said plane bearing surface, an end wall at the distal end of said yoke having a lubricant deflecting surface having a portion which projects from said one side of said cutter carrier beyond said plane bearing surface, said lubricant deflecting surface extending transversely across said cutter carrier to the side bearing surface located at the other side of said cutter carrier, a laterally projecting arm extending from one side of said cutter carrier radially outward of said lubricant deflecting surface, a cutter mounted on said arm, said lubricant deflecting surface extending beyond said plane bearing surface and being so oriented as to intercept lubricant ejected from the space between said surfaces and to direct such intercepted lubricant to the side bearing surface and away from said cutter carrying arm, and lubricant directing means located on said cutter carrier radially outwardly of said lubricant deflecting surface for directing lubricant deposited on said cutter carrier radially outward of said lubricant deflecting surface away from said arm to said side bearing surface.

6. In a trimming mechanism as recited in claim 5, wherein said directing means comprises surfaces which are radially divergent from the axis of said rock shaft toward said side bearing surface.

7. In a trimming mechanism as recited in claim 6, wherein a lubricant excluding recess is located on said cutter carrier below said laterally projecting arm.

8. In a trimming mechanism as recited in claim 6, wherein a lubricant excluding recess is located on said cutter carrier below said laterally projecting arm.

9. In a trimming mechanism for a sewing machine having a frame, a rock shaft journaled in said frame, an elongated arm pivotally supported at one end of said rock shaft, cutter mounting means on said arm, means adapted to drive said arm in oscillatory movement about said rock shaft including a sliding block disposed within a yoke on said arm, a plane bearing surface on said frame at one side of said arm slidably engaging a face of said sliding block, a side bearing surface on the other side of said arm slidably engaging a mating side bearing surface on the frame; the improvement comprising means for preventing flow of lubricant along said arm to a region where said lubricant would come in contact with material being operated on by said trimming mechanism, said means including an end wall on said arm located between said yoke on said cutter mounting means having a surface extending from said side bearing surface transversely across said arm and projecting from said one side of said arm beyond said plane bearing surface so that lubricant ejected from the space between said sliding block and said plane bearing surface is directed to said side bearing surface by centrifugal force.

10. In a trimming mechanism for a sewing machine having a frame, a rock shaft journaled in said frame, an elongated cutter carrier pivotally supported at one end on said rock shaft, means adapted to drive said cutter carrier in oscillatory movement about said rock shaft, a plane bearing surface on said frame at one side of said cutter carrier slidably engaging a face of said sliding block, a side bearing surface on the other side of said cutter carrier slidably engaging a mating side bearing surface on the frame; the improvement comprising means for preventing flow of lubricant along said cutter carrier to a region where said lubricant would come in contact with material being operated on by said trimming mechanism, said means including an end wall on said carrier having a lubricant deflecting surface projecting from said one side of said cutter carrier beyond said plane bearing surface and extending traversely across said cutter carrier toward said side bearing surface, said lubricant deflecting surface being diverged from the axis of said rock shaft in a direction toward said side bearing surface so that lubricant ejected from the space between said sliding block and said plane bearing surface is intercepted by the projecting portion of said lubricant deflecting surface and is driven to said side bearing surface by the centrifugal force resulting from the oscillating rotary movement of the cutter carrier.

References Cited in the file of this patent

UNITED STATES PATENTS

| | | |
|---|---|---|
| 733,760 | Stedman | July 14, 1903 |
| 992,163 | Chappell et al. | May 16, 1911 |
| 1,207,063 | Merrow | Dec. 5, 1916 |
| 1,388,345 | Kemble | Aug. 23, 1921 |
| 1,407,442 | Saives | Feb. 21, 1922 |
| 1,655,151 | Lund | Jan. 3, 1928 |
| 2,103,899 | Fleckenstein | Dec. 28, 1937 |
| 2,755,757 | Pierce | July 24, 1956 |